(12) United States Patent
Saito (10) Patent No.: US 7,140,775 B2
(45) Date of Patent: Nov. 28, 2006

(54) SLIDING GUIDE APPARATUS (75) Inventor: Toshiyuki Saito, Toyoake (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 153 days.

(21) Appl. No.: 10/892,255

(22) Filed: Jul. 16, 2004

(65) Prior Publication Data
US 2005/0013512 A1  Jan. 20, 2005

(30) Foreign Application Priority Data
Jul. 17, 2003  (JP) .............................. 2003-276074

(51) Int. Cl.
F16C 29/02 (2006.01)
(52) U.S. Cl. .......................... 384/13; 384/12
(58) Field of Classification Search ................... 384/12, 384/13; 409/235
See application file for complete search history.

(56) References Cited
U.S. PATENT DOCUMENTS 3,109,514 A * 11/1963 Deflandre ....................... 184/5
3,231,320 A * 1/1966 Krafft ........................... 384/12
3,508,430 A * 4/1970 Edmondson ................... 384/12
3,635,532 A * 1/1972 Zerbola ......................... 384/12
3,903,993 A * 9/1975 Vorrhees et al. .............. 384/12
6,749,378 B1 * 6/2004 Saito et al. ................... 409/235

* cited by examiner

Primary Examiner—Thomas R. Hannon
(74) Attorney, Agent, or Firm—Oblon, Spivak, McClelland, Maier & Neustadt, P.C.

(57) ABSTRACT

A sliding guide apparatus guides a movable member for a base. A pair of guide surfaces are formed on the base. A pair of sliding surfaces are formed on the movable member as so to be opposed to the pair of guide surfaces, respectively. Lubricating oil is supplied between the guide surface and the sliding surface. The sliding surface is configured so that one half portion of the sliding surface which is close to the center of gravity of the movable member is asymmetric with the other half portion of the sliding surface which is far from the center of gravity of the movable member. Since a load of the movable member that acts disproportionately on the sliding surface is balanced with dynamic pressure of the lubricating oil that occurs between the guide surface and the sliding surface, it is prevented that the movable member is slanted.

6 Claims, 7 Drawing Sheets

SLIDING GUIDE APPARATUS

INCORPORATION BY REFERENCE

The present application claims priority under 35 U.S.C. §119 to Japanese Patent Application No. 2003-276074, filed on Jul. 17, 2003. The contents of that application are incorporated herein by reference in their entirety.

BACKGROUND OF THE INVENTION

1. Field of the Invention

This invention relates to a sliding guide apparatus to guide, for instance, a column or a worktable for a bed of a machine tool. More particularly, it relates to a sliding guide apparatus on which an unbalanced load of a movable member acts.

2. Discussion of the Background

A conventional sliding guide apparatus guides a movable member on which sliding surfaces are formed for a base on which guide surfaces are formed with lubricating oil which is supplied between the sliding surfaces and the guide surfaces. In a case that the movable member is moved rapidly, the lubricating oil that has gotten between the sliding surface and the guide surface at the front portion of the movable member in its traveling direction generates dynamic pressure which floats the movable member. Since the front portion of the movable member is more floated than a rear portion by the dynamic pressure, the movable member is slanted. As a result, frictional force or sliding resistance of the sliding surface for the guide surface is increased, and a larger feed force is needed.

Figure 1:
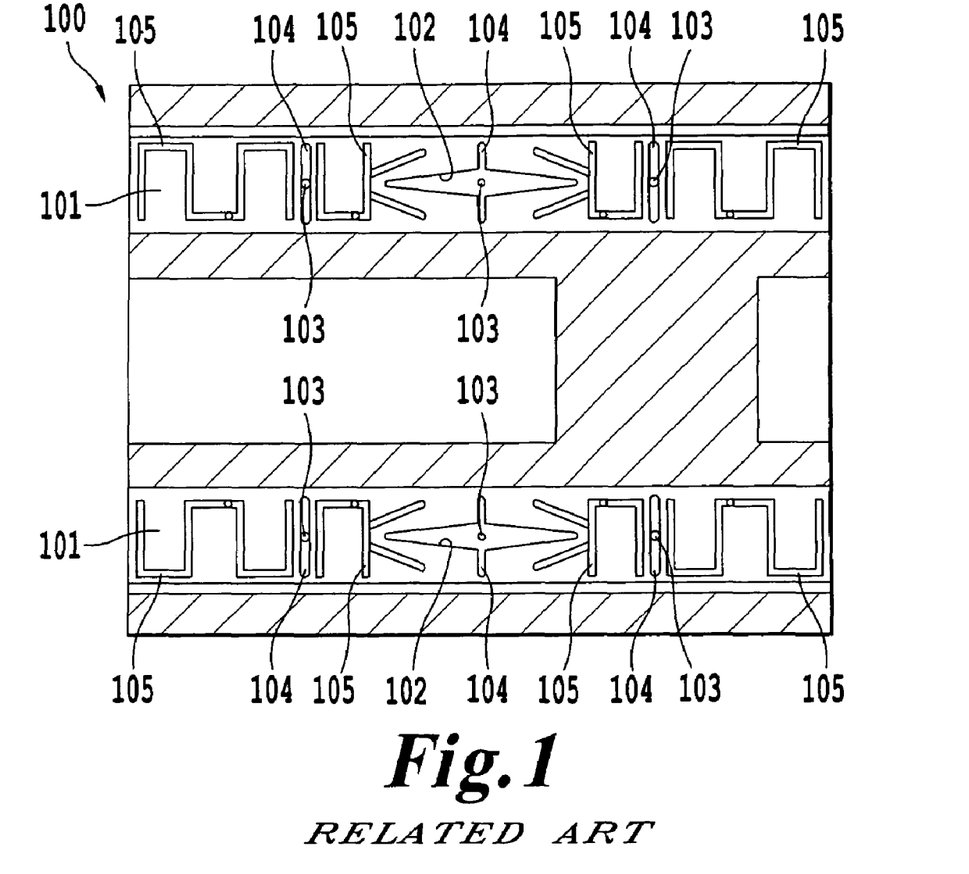
FIG. 1 is a bottom plane view of sliding surfaces of a sliding guide apparatus at a related art.

Accordingly, the inventor has invented a sliding guide apparatus which is provided with a relief means to relieve a part of the dynamic pressure to the atmospheric air so as to reduce the effect of the dynamic pressure and a sliding guide apparatus which disperses the dynamic pressure evenly along the traveling direction of the sliding surface so as to prevent the floating and the slanting of the movable member. FIG. 1 shows sliding surfaces 101 of such a sliding guide apparatus 100. Lubricating oil is supplied between the sliding surface 101 and a guide surface (not shown) that is disposed opposed to the sliding surface through supply grooves 105. A diamond-shape pocket 102 is formed on each sliding surface at the center in a traveling direction (right and left direction on the sheet) of a movable member. A relief hole 103 whose one-end is connected with the atmospheric air is opened at the center of the pocket 102 so as to relieve pressure of the lubricating oil that occurs in the pocket 102. Meanwhile, three separating grooves 104 are formed on each sliding surface 101 so as to divide the sliding surface in equal interval in the traveling direction of the movable member. A relief hole 103 whose one-end is connected with the atmospheric air is also opened in each separating groove 104 so as to relieve to pressure of the lubricating oil that occurs in the separating groove 104.

According to the sliding guide apparatus 100, the floating of the movable member that is caused by the dynamic pressure can be reduced, and the slanting of the movable member is significantly prevented. However, the floating by the dynamic pressure can not be prevented perfectly. In a case that the sliding guide apparatus is used for a machine tool in which a column or a worktable as a movable member is guided, the unbalanced load of the column or the workpiece that is set on the worktable acts on the sliding guide apparatus 100. Therefore, the column or the worktable is slanted by this unbalanced load in a state that the column or the worktable is floated by the dynamic pressure even if only a little.

SUMMARY OF THE INVENTION

In view of the foregoing, it is an object of the present invention to provide improved sliding guide apparatus. In order to achieve the above and other objects, a first aspect of the present invention provides a sliding guide apparatus which guides a movable member for a base. The sliding guide apparatus comprises a guide surface formed on the base, a sliding surface formed on the movable member so as to be opposed to the guide surface, and lubricating oil supplied between the guide surface and the sliding surface. The sliding surface is configured so that one half portion of the sliding surface which is close to the center of gravity of the movable member is asymmetric with the other half portion of the sliding surface which is far from the center of gravity of the movable member. Since a larger load of the movable member acts on the one half portion than the other half portion of the sliding surface, the sliding surface is configured so that less dynamic pressure occurs on the other half portion than the one half portion.

A second aspect of the present invention provides a sliding guide apparatus which guides a movable member for a base. The sliding guide apparatus comprises a couple of guide surfaces formed on the base, a couple of sliding surfaces formed on the movable member so as to be opposed to the guide surface, and lubricating oil supplied between the guide surface and the sliding surface. The sliding surface is configured so that one of the sliding surfaces which is located close to the center of gravity of the movable member is asymmetric with the other of the sliding surfaces which is located far from the center of gravity of the movable member. Since a larger load of the movable member acts on one of the sliding surfaces than the other of the sliding surfaces, the sliding surfaces are configured so that less dynamic pressure occurs on the other of sliding surfaces than the one of the sliding surfaces.

A third aspect of the present invention provides a sliding guide apparatus which guides a movable member for a base. The sliding guide apparatus comprises a couple of guide surfaces formed on the base, a couple of sliding surfaces formed on the movable member so as to be opposed to the guide surface, and lubricating oil supplied between the guide surface and the sliding surface. The sliding surface is configured so that one half portion of each sliding surface in its longitude direction which is close to the center of gravity of the movable member is asymmetric with the other half portion of each sliding surface which is far from the center of gravity of the movable member. Since a larger load of the movable member acts on one half portion of the sliding surfaces than the other half portion of sliding surfaces, the sliding surfaces are configured in the longitudinal direction so that less dynamic pressure occurs on the other of sliding surfaces than the one of the sliding surfaces.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

First Embodiment

Figure 2A:
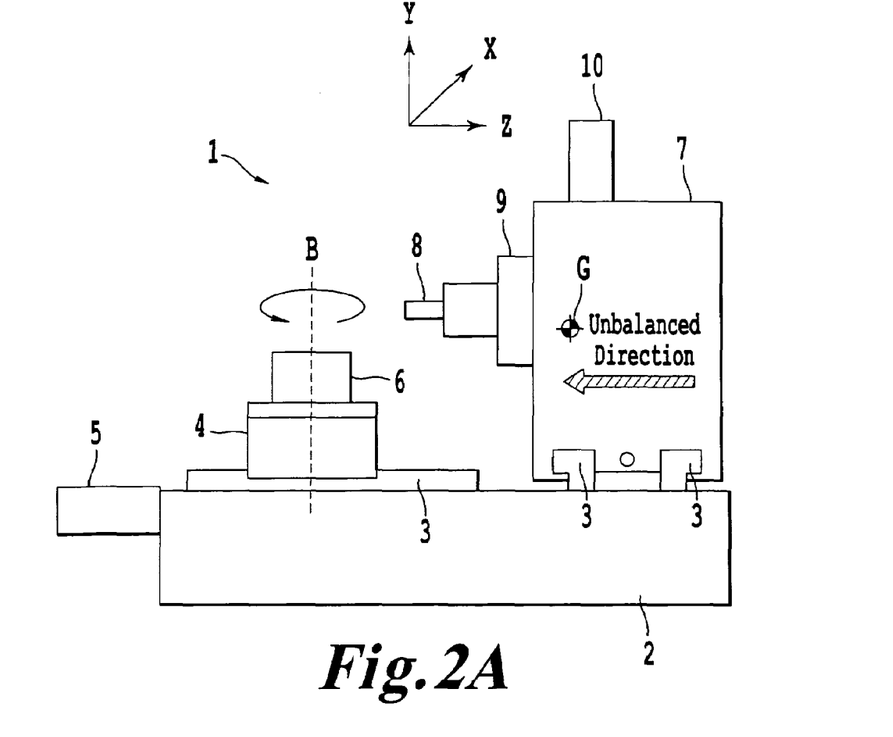
FIG. 2(A) is a side view of a machining center in which a sliding guide apparatus as a first embodiment of the present invention is adapted.
Figure 2B:
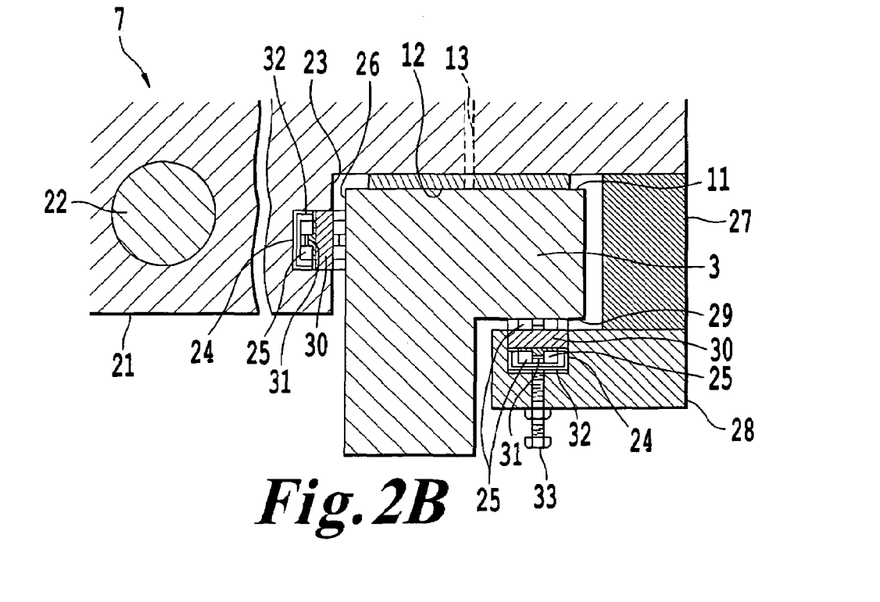
FIG. 2(B) is a partial enlarged cross sectional view of the sliding guide apparatus of the first embodiment.
Figure 3A:
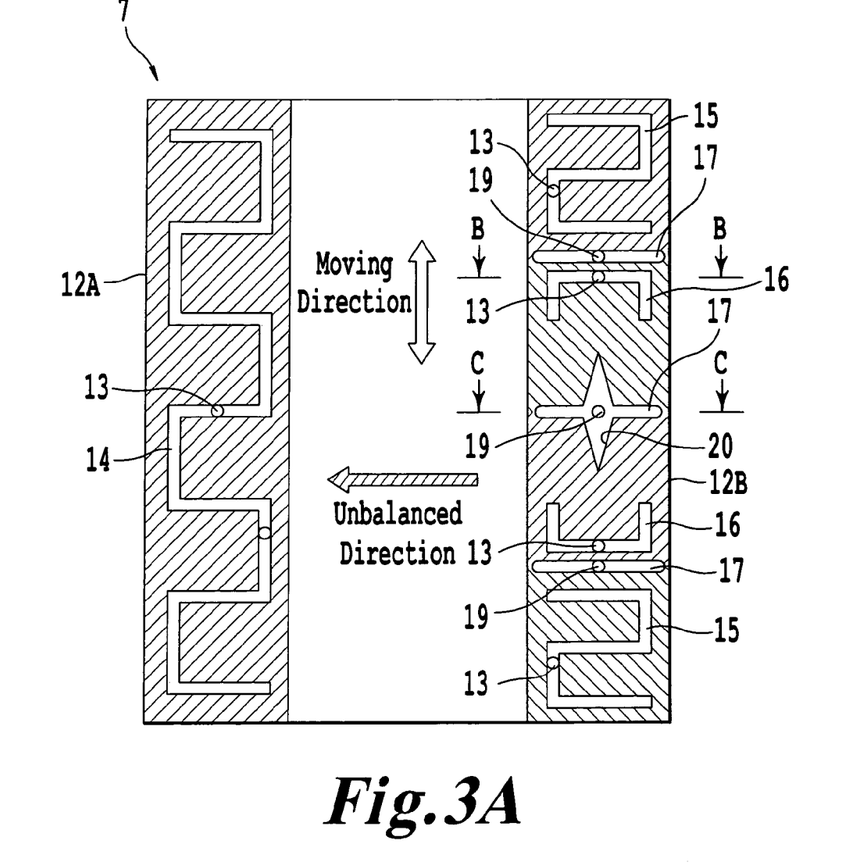
FIG. 3(A) is a bottom plane view of a column showing sliding surfaces of the sliding guide apparatus of the first embodiment.
Figure 3B:
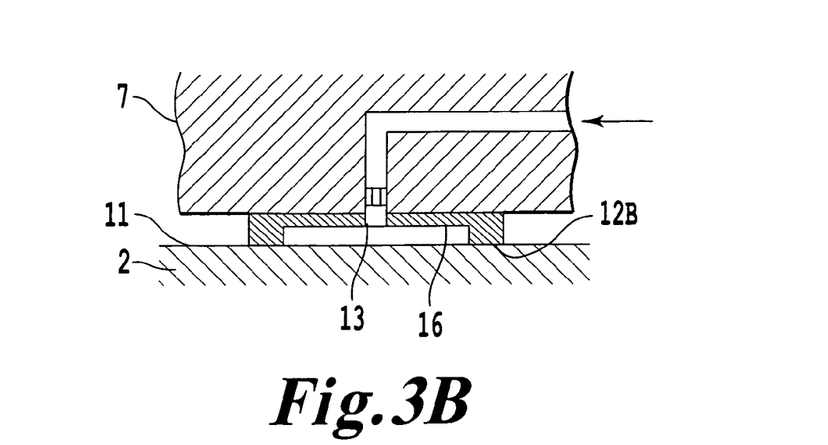
FIG. 3(B) is a cross sectional view taken along the line B—B of the FIG. 3(A)
Figure 3C:
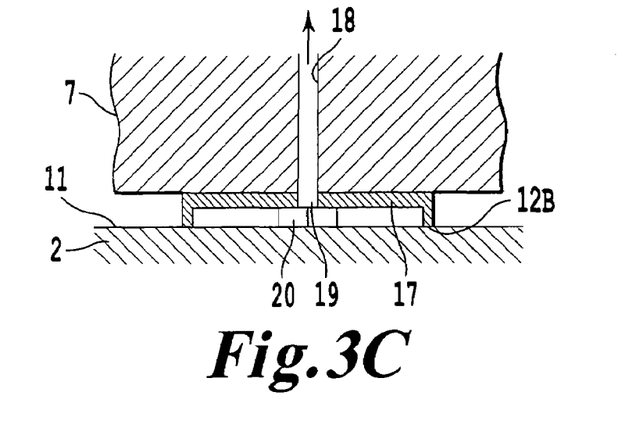
FIG. 3(C) is a cross sectional view taken along the line C—C of the FIG. 3(A)

A sliding guide apparatus as a first embodiment of the present invention will be described hereinafter with reference to FIGS. 2, 3. A machine tool 1 shown by FIG. 2(A) is a machining center in which X-axis, Y-axis, Z-axis and B-axis are controlled by a computerized numerical controller (CNC, not shown), for which the sliding guide apparatus is used. With a bed 2 as a base supporting the whole of the machine, two pairs of parallel guide members 3 are provided along the X-axis (the direction perpendicular to the sheet) and the Z-axis (right and left direction on the sheet), respectively. Each pair of the guide members constructs a sliding guide apparatus. A rotary table 4 that is rotatable around the B-axis is supported on the pair of guide members 3 which is along the Z-axis so as to be able to be moved along the Z-axis by a driving device 5. A workpiece 6 is set on the rotary table 4 via a pallet, is rotated by the rotary table 4, and can be indexed precisely. On the other hand, a column 7 is supported on the pair of guide members 3 which is along the X-axis so as to be able to be moved along the X-axis by a driving device (not shown). A cutting tool 8 and a spindle head 9 that rotatably supports the cutting tool 8 are supported on another sliding guide apparatus (not shown) which is provided on a side (left side on the sheet) of the column 7 along the Y-axis (up and down direction on the sheet) so as to be able to be moved along the Y-axis by a driving device 10 equipped on the top of the column 7. The cutting tool 8 is rotated by a spindle motor (not shown) in order to cut the workpiece 8. A stepping motor or a servo motor can be used for each driving device that is controlled by the CNC.

Since the cutting tool 8 and the spindle head 9 are equipped on the left side of the column 7, the center of gravity G of the column 7 is located at a left side for the center of the pair of the guide members 3. That is, since the location of the center of gravity G of the column 7 is close to the left side guide member 3 and far from the right side guide member 3, larger load acts at the left side guide member 3 than right side guide member 3.

The guide members 3 that guide the column 7 are a reversed L-shape protruding upwardly from the bed 2, and are arranged symmetrically so as to be separated with an appropriate distance each other. As shown by FIG. 2(B), a guide surface 11 is formed on each guide member 3, and contacts with a sliding surface 12 that is formed on the under surface of the column 7 so as to be opposed to the guide surface 12, respectively. Oil-supplying holes 13 that supply lubricating oil between the guide surface 11 and the sliding surface 12 are formed on the sliding surface 12. A couple of the sliding surfaces 12 is formed on the under surface of the column 7 so as to be extended along the traveling direction of the column 7 as shown by FIG. 3(A). Each sliding surface 12 is the same length and the same width in this embodiment. Oil-supplying grooves 14 which the oil-supplying hole 13 is opened thereinto are formed on the sliding surfaces 12. One oil-supplying groove 14 that is a crank-shape and extends the entirety of the sliding surface 12 is formed on the left side sliding surface 12A on which much load acts because of the unbalance of the column 7. On the other hand, the right side sliding surface 12B on which less load acts because of the unbalance of the column 7 is asymmetric with the left side sliding surface 12A. Two crank-shape oil-supplying grooves 15 are arranged at both ends of the sliding surface 12B in its longitude direction (X-axis direction), and a couple of horseshoe-shape oil-supplying grooves 16 are arranged inside the crank-shape oil-supplying grooves 15. The oil-supplying hole 13 is connected with each oil-supplying groove 14, 15, 16 as shown by FIG. 3(B), and lubricating oil is supplied thereinto through an oil pump (not shown). Further, on the right side sliding surface 12B, three relief grooves 17 are formed. The relief grooves 17 are extended to the width direction (Z-axis direction), and arranged to separate the sliding surface 12B into approximately equal intervals. A relief hole 19 is formed at the center of the each relief groove 17. One end of the relief hole 19 is opened with the relief groove 17 and another end of the relief hole 19 is relieved to the atmospheric air. Therefore, a part of dynamic pressure that occurs between the guide surface 11 and the sliding surface 12 can be relieved to the atmospheric air. A diamond-shape pocket 20 is formed on the center of the right side sliding surface 12B, and is connected with the center relief groove 17. Therefore, a part of the dynamic pressure can also be relieved through the diamond-shape pocket 20. The dynamic pressure can be more relieved at the middle portion than the end portions of the sliding surface 12B in its longitude direction.

As shown by FIG. 2(B), a protrusion 21 is formed on the lower surface of the column 7 between both guide members 3 so as to protrude lower than the height of the guide members 3. A ball screw 22 that is extended along the X-axis is engaged with a nut (not shown) at the protrusion 21. The column 7 is moved along the X-axis by rotating the ball screw 22. At the side portion 23 of the protrusion 21, which is opposed to the inner side of the guide member 3, a roller guide unit 24 is built in so that plural rollers 25 of the roller guide unit 24 contact with a side guide surface 26 of the guide member 3. A side plate 27 that is extended downward at the outside of the guide member 3 is attached with the lower surface of the column 7. A backup plate 28 that is extended to an under portion of the guide member 3 is attached with the lower surface of the side plate 27. Another roller guide unit 24 is built in the backup plate 28 so that plural rollers 25 of the roller guide unit 24 contact with a lower guide surface 29 of the guide member 3. The roller guide unit 24 comprises the plural rollers 25, a guide member 30 that guides the rollers 25 so as to be drawn up two lines, a retainer 31 that retains the rollers 25, a bias member 32 that pushes the rollers 25 to the side guide surface 26 or the lower guide surface 29, and a bolt 33 that adjusts the bias member 32. When the column 7 is moved, the rollers 25 are rotated with contacting the side guide surface 26 or the lower guide surface 29 of the guide member 3, and are simultaneously turned around the guide member 30. Therefore, the roller guide unit 24 can prevent rolling and yawing of the column 7 with low sliding resistance.

Figure 4A:
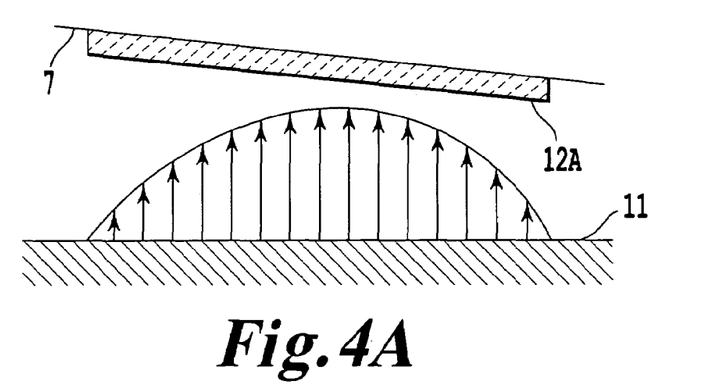
FIG. 4(A) is a diagram showing pressure distribution on the left side sliding surface of the first embodiment.
Figure 4B:
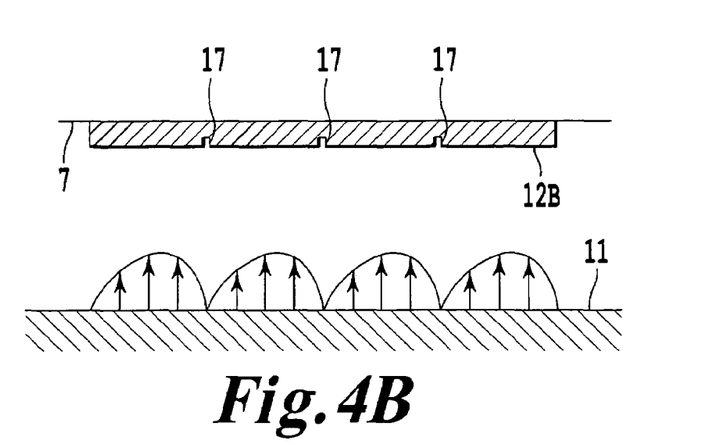
FIG. 4(B) is a diagram showing pressure distribution on the right side sliding surface of the first embodiment.
Figure 5A:
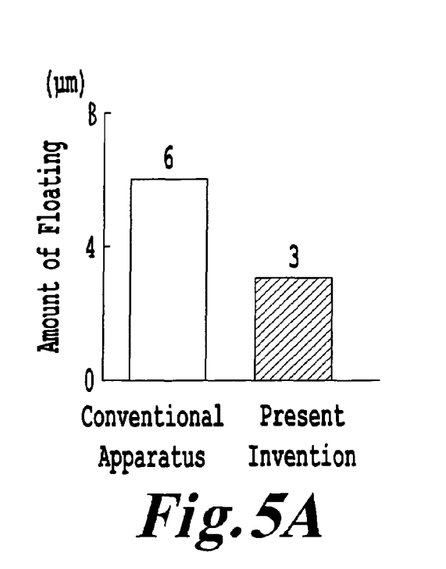
FIG. 5(A) is a graph showing amount of floating of a movable member of the present invention in comparison with a conventional apparatus.
Figure 5B:
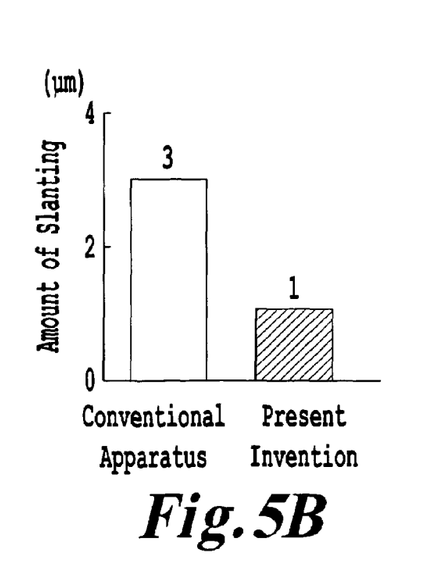
FIG. 5(B) is a graph showing amount of slanting of a movable member of the present invention in comparison with a conventional apparatus.

Operation of the above-described embodiment will be explained by reference to FIGS. 4(A), 4(B), 5. When the ball screw 22 is rotated by a motor (not shown), the column 7 is moved backward and forward along the X-axis in proportion to the rotation of the ball screw 22. Then, the sliding surfaces 12A, 12B of the column 7 slide on the guide surfaces 11 of the sliding members 3 with the lubricating oil that is supplied therebetween through the oil-supplying holes 13 and the oil-supplying grooves 14, 15, 16. Since the spindle head 9 and the driving device 10 are disposed on the left side of the column 7, the center of gravity G of the column 7 is also in the left side. Therefore, the load of the column 7 acts more on the left side sliding surface 12A than the right side sliding surface 12B. Meanwhile, when the column 7 is moved, since the lubricating oil has gotten between the guide surfaces 11 and the sliding surfaces 12A, 12B at the front end thereof in the moving direction, the dynamic pressure occurs therebetween. Then, a large amount of dynamic pressure occurs on the left side sliding surface 12A. As shown by FIG. 4(A), a pressure distribution of the dynamic pressure occurring on the left side sliding surface 12A is large throughout the whole of the sliding surface 12A in its longitudinal direction. Now, the area of the amount of the pressure distribution represents an amount of the dynamic pressure. On the other hand, since the relief grooves 17 are formed, only small amount of the dynamic pressure occurs on the right side sliding surface 12B. That is, since a part of the dynamic pressure is relieved through the relief grooves 17, pressure distribution of the dynamic pressure occurring on the right side sliding surface 12B is divided into four small amounts as shown by FIG. 4(B). The amount of the dynamic pressure is a sum of areas of the four amounts of the pressure distribution. This means that a large dynamic pressure occurs on the sliding surface 12A on which the large load of the column 7 acts, and a small dynamic pressure occurs on the sliding surface 12B on which the small load of the column 7 acts. As a result, it is prevented that the left side of the column 7 sinks by the load thereof and the right side of the column 7 floats by the dynamic pressure. Therefore, slanting of the column 7 is significantly prevented. As shown by FIG. 5 that shows a result of an experiment, the floating amount of the column 7 of the present invention is reduced to a half in comparison with a conventional sliding guide apparatus, and the slanting amount of the column 7 of the present invention is reduced to one third in comparison with the conventional sliding guide apparatus.

As described above, the sliding surfaces 12A, 12B are asymmetric about the X-axis so that the dynamic pressure occurs on the sliding surface 12A on which a large load acts because of its being closer to the center of gravity G of the column 7. And, the dynamic pressure occuring on the sliding surface 12B on which the small load acts because of its being far from the center of gravity G of the column 7 is prevented. Therefore, since the load that acts on the sliding surfaces 12A, 12B is balanced with the dynamic pressure that occurs on the sliding surface 12A, 12B, respectively, the slanting of the column 7 is significantly reduced. As a result, it is prevented that uneven abrasion occurs on the guide surface or the sliding surface. Further, it is also prevented that sliding resistance is increased, and large power for moving the column 7 is not required. Since these advantages can be achieved by making the surface form of the sliding surfaces differ, the dimensions of the sliding surface do not need to be increased by making the sliding surface wide or making the sliding surface V-shape. Furthermore, the size of the machine tool does not need to be increased.

In the above-described first embodiment, neither the relief groove 17 nor the diamond-shape pocket 20 is formed on the left side sliding surface 12A, and three relief grooves 17 and one diamond-shape pocket 20 are formed on the right side sliding surface 12B. However, the amount of the dynamic pressure occurring on each sliding surface can be controlled by forming the relief grooves 17 and/or the diamond-shape pockets 20 on both sliding surfaces 12A, 12B, and making numbers of these grooves and/or the pocket be different or location of these grooves and/or the pocket be different.

Second Embodiment

Figure 6A:
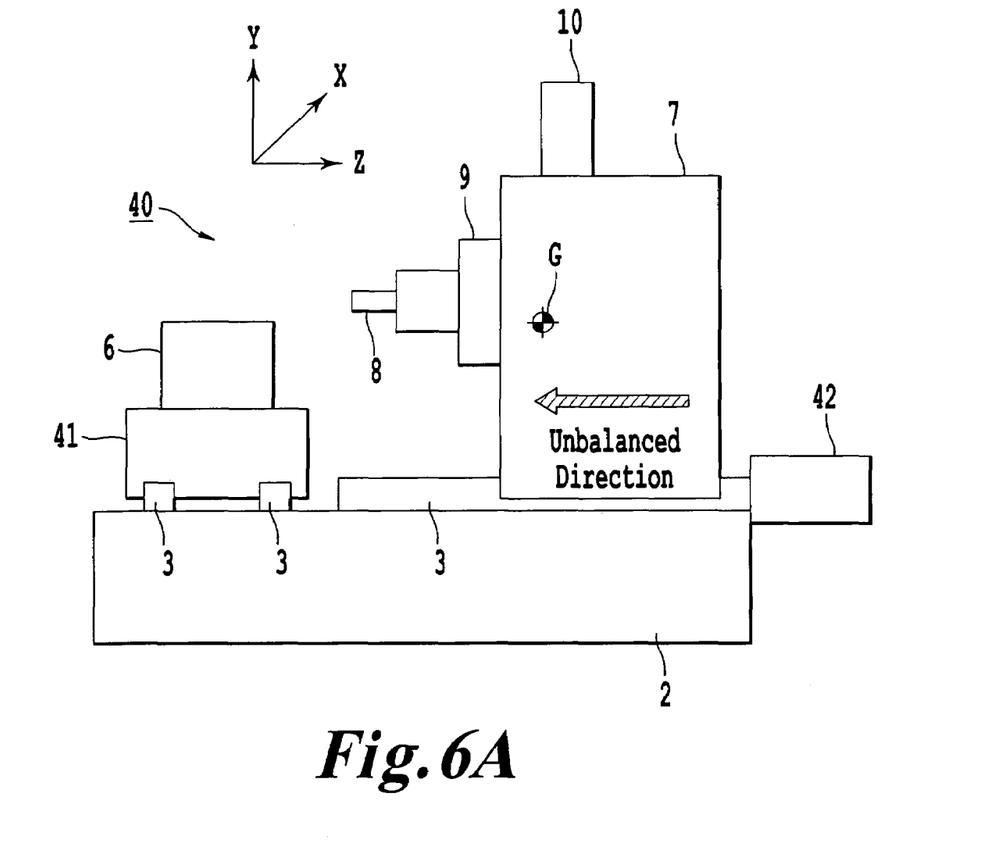
FIG. 6(A) is a side view of a machining center in which a sliding guide apparatus as a second embodiment of the present invention is adapted.

A sliding guide apparatus as a second embodiment of the present invention will be described hereinafter with reference to FIG. 6. A machine tool 40 shown by FIG. 6(A) is a machining center in which X-axis, Y-axis, Z-axis and B-axis are controlled by a computerized numerical controller (CNC, not shown), for which the sliding guide apparatus is used. With a bed 2 as a base supports the whole of the machine, two pairs of parallel guide members 3 are provided along the X-axis (the direction perpendicular to the sheet) and the Z-axis (right and left direction on the sheet), respectively. Each pair of the guide members 3 constructs a sliding guide apparatus. A table 41 on which a workpiece 6 is set is supported on the pair of guide members 3 which extends along the X-axis so as to be able to be moved along the X-axis by a driving device (not shown). On the other hand, a column 7 is supported on the pair of guide members 3 which extend along the Z-axis so as to be able to be moved along the Z-axis by a driving device 42. A cutting tool 8 and a spindle head 9 that rotatably supports the cutting tool 8 are supported on another sliding guide apparatus (not shown) which is provided on a side (left side on the sheet) of the column 7 along the Y-axis (up and down direction on the sheet) so as to be able to be moved along the Y-axis by a driving device 10 equipped on the top of the column 7. The cutting tool 8 is rotated by a spindle motor (not shown) in order to cut the workpiece 8. A stepping motor or a servo motor can be used for each driving device that is controlled by the CNC.

Figure 6B:
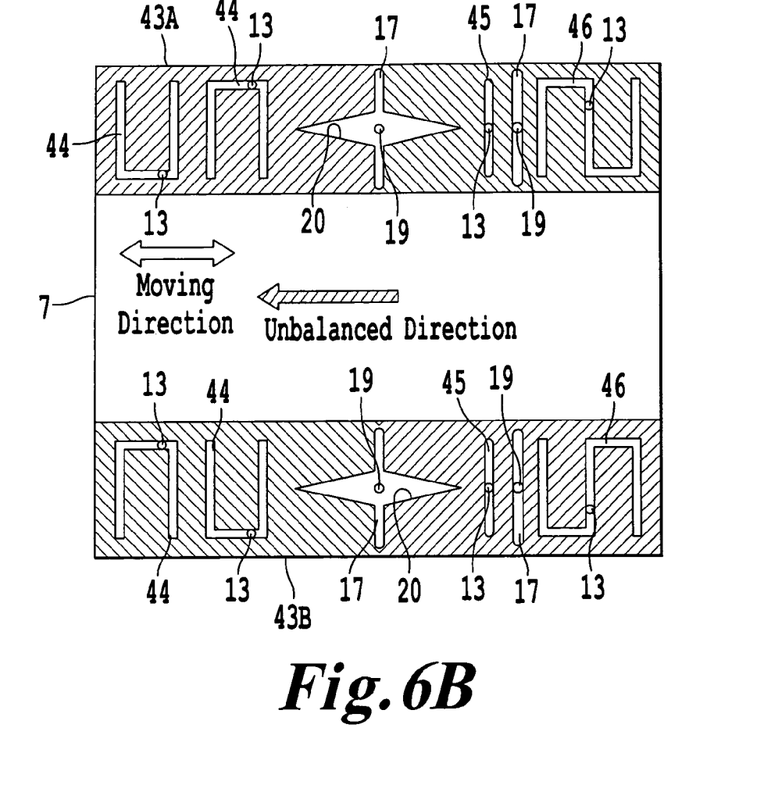
FIG. 6(B) is a bottom plane view of a column showing sliding surfaces of the sliding guide apparatus of the second embodiment.

The guide members 3 that guide the column 7 are a reversed L-shape protruding upwardly from the bed 2, and are arranged symmetrically so as to be separated with an appropriate distance from each other. A guide surface (not shown) is formed on each guide member 3, and contacts with a sliding surface that is formed on the under surface of the column 7 so as to be opposed to the guide surface, respectively. Oil-supplying holes 13 that supply lubricating oil between the guide surface and the sliding surface are formed on the sliding surface 43A, 43B. A couple of the sliding surfaces 43A, 43B are formed on the under surface of the column 7 so as to be extended along the traveling direction of the column 7 as shown by FIG. 6(B). Since two sliding surfaces 43A, 43B are the same in this embodiment, the construction of the one sliding surface 43A will be described. A couple of relief grooves 17 are formed on the sliding surface 43A so as to be extended to the width direction (X-axis direction). One of the relief grooves 17 is located at the center of the sliding surface 43A, and the other is located at a left side at a position by which the sliding surface 43A is quadrisected in its longitude direction (Z-axis direction). A relief hole 19 is formed at the center of the each relief groove 17. One end of the relief hole 19 is opened with the relief groove 19 and another end of the relief hole 19 is relieved to the atmospheric air. Therefore, a part of dynamic pressure that occurs between the guide surface and the sliding surface 43A can be relieved to the atmospheric air. A diamond-shape pocket 20 is formed at the center of the sliding surface 43A and connected with the center relief groove 17. The sliding surface 43A is an asymmetric shape between the left side of the diamond-shape pocket 20 and the right side of the diamond-shape pocket 20. On the left side of the sliding surface 43A, a couple of horseshoe-shape oil-supplying grooves 44 are formed so as to be 180 degrees reversed from each other. On the right side of the sliding surface 43A, a straight oil-supplying groove 45 is formed so as to be extended parallel with the relief grooves 17 and between the relief grooves 17. A crank-shape oil-supplying groove 46 is also formed on the rightmost side of the sliding surface 43A. An oil-supplying hole 13 is connected with each oil-supplying groove 44, 45, 46, and lubricating oil is supplied thereinto through an oil pump (not shown).

Since the cutting tool 8 and the spindle head 9 are equipped on the left side of the column 7, the center of gravity G of the column 7 is located at a left side for the center of the pair of the guide members 3. When the sliding surfaces 43A, 43B are divided to two half portions by the center relief groove 17 in its longitudinal direction, the left half portion of each sliding surface 43A, 43B is close to the center of gravity G, and the right half portion of each sliding surface 43A, 43B is far from the center of gravity G. That is, a larger load acts at the left half portion of each sliding surface 43A, 43B than the right half portion of each sliding surface 43A, 43B in the Z-axis direction.

Figure 4C:
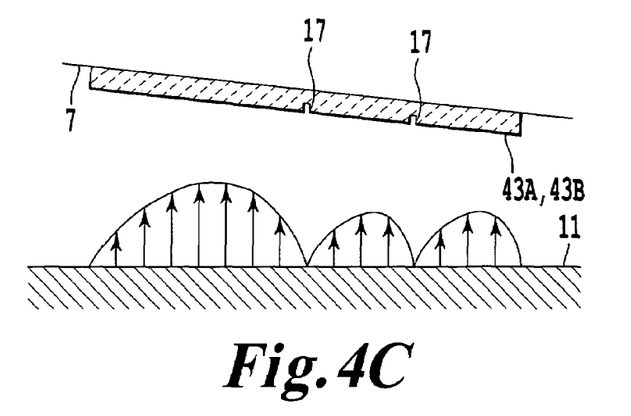
FIG. 4(C) is a diagram showing pressure distribution on a sliding surface of a second embodiment.

Operation of the above-described embodiment will be explained by reference to FIG. 4(C). When the column 7 is moved backward and forward along the Z-axis, the sliding surfaces 43A, 43B of the column 7 slides on the guide surfaces of the sliding members 3 with the lubricating oil that is supplied therebetween. Since the spindle head 9 and the driving device 10 are disposed on the left side of the column 7, the center of gravity G of the column 7 is also in the left side. Therefore, the load of the column 7 acts more on the left side of each sliding surface 43A, 43B than the right side of each sliding surface 43A, 43B. Meanwhile, when the column 7 is moved, since the lubricating oil has gotten between the guide surfaces and the sliding surfaces 43A, 43B at the front end thereof in the moving direction, the dynamic pressure occurs therebetween. Then, large amount of dynamic pressure occurs on the left side of each sliding surface 43A, 43B. On the other hand, since the relief grooves 17 are formed, only a small amount of the dynamic pressure occurs on the right side of each sliding surface 43A, 43B, because a part of the dynamic pressure is relieved through the relief grooves 17. As shown by FIG. 4(C), the pressure distribution of the dynamic pressure occurring on the each sliding surfaces 43A, 43B shows a large amount in the left side and two divided small amounts in the right side. This means that a large dynamic pressure occurs on the left side of sliding surface 43A on which the large load of the column 7 acts, and a small dynamic pressure occurs on the right side of the sliding surface 43B on which the small load of the column 7 acts. As a result, it is prevented that the left side of the column 7 sinks by the load thereof and the right side of the column 7 floats by the dynamic pressure. Therefore, slanting of the column 7 is significantly prevented.

As described above, the sliding surfaces 43A, 43B are asymmetric about the Z-axis, so that the dynamic pressure occurs on the left half portion of each sliding surface 43A, 43B on which the large load acts because of being close to the center of gravity G of the column 7. And, it is prevented that dynamic pressure occurs on the right half portion of each sliding surface 43A, 43B on which the large load does not act because of its being far from the center of gravity G of the column 7. Therefore, since the load that acts on the sliding surfaces 43A, 43B is balanced with the dynamic pressure that occurs on the sliding surfaces 43A, 43B, respectively, the slanting of the column 7 is significantly reduced.

Modifications

Figure 7:
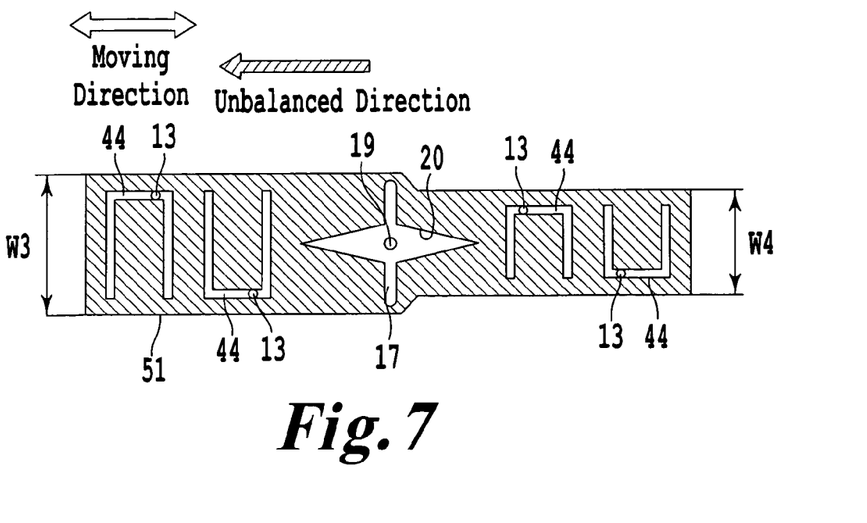
FIG. 7 is a bottom plane view of a movable member showing a sliding surface of a sliding guide of a modification of the second embodiment.

The sliding surfaces are designed so as to be asymmetric for the direction for which the load of column is unbalanced. In order to get asymmetrical shapes of the sliding surfaces, a different number of the relief grooves and/or the diamond-shape pockets are formed and the relief grooves and/or the diamond-shape pockets are formed on different locations in the first and the second embodiment. However, it is possible that dimensions of the sliding surfaces are different in order to be asymmetric. For example, a sliding surface 51 is designed so that a width W3 of the left side of the sliding surface 51 is wider than a width W4 of the right side of the sliding surface 51 as shown by FIG. 7. The left side of the sliding surface 51 on which a large load acts is wider so that a large dynamic pressure occurs, and the right side of the sliding surface 51 on which small load acts is narrower so that a small dynamic pressure occurs.

The sliding guide apparatus that guides the column is described in the first and the second embodiment. However the sliding guide apparatus of the present invention can be adapted to guide the rotary table 4 or the table 41 on which unbalanced workpieces are set or on which workpieces are disproportionately set.

Obviously, other numerous modifications and variations of the present invention are possible in light of the above teachings. It is thereby to be understood that within the scope of the appended claims, the present invention may be practiced otherwise than as specifically described herein.

What is claimed is:

1. A sliding guide apparatus which guides a movable member for a base comprising:
   a guide surface formed on the base;
   a sliding surface formed on the movable member so as to be opposed to the guide surface; wherein one half portion of the sliding surface which is closer to the center of gravity of the movable member is asymmetric with the other half portion of the sliding surface which is farther from the center of gravity of the movable member, lubricating oil supplied between the guide surface and the sliding surface; and at least one relief groove that relieves dynamic pressure of the lubricating oil occurring between the guide surface and the sliding surface formed on the other half portion of the sliding surface so that the one half portion of sliding surface is asymmetric with the other half portion of the sliding surface.

2. A sliding guide apparatus which guides a movable member for a base comprising:

a pair of guide surfaces formed on the base;

a pair of sliding surfaces formed on the movable member so as to be opposed to the pair of guide surfaces, respectively; wherein one half portion of each sliding surfaces in its longitudinal direction which is close to the center of gravity of the movable member is asymmetric with the other half portion of each sliding surfaces which is far from the center of gravity of the movable member, lubricating oil supplied between the guide surfaces and the sliding surfaces; and at least one relief groove that relieves dynamic pressure of the lubricating oil occurring between the pair of guide surfaces and the pair of sliding surfaces formed on the other half portion of the sliding surfaces so that the one half portion of sliding surfaces is asymmetric with the other half portion of the sliding surfaces.

3. A sliding guide apparatus according to claim 2, wherein:

a dimension of the one half portion of sliding surfaces is larger than dimension of the other half portion of sliding surfaces so that the one half portion of sliding surfaces is asymmetric with the other half portion of sliding surfaces.

4. A sliding guide apparatus which guides a movable member for a base comprising:

a pair of guide surfaces formed on the base;

a pair of sliding surfaces formed on the movable member so as to be opposed to the pair of guide surfaces, respectively; wherein one half portion of each sliding surfaces in its longitudinal direction which is close to the center of gravity of the movable member is asymmetric with the other half portion of each sliding surfaces which is far from the center of gravity of the movable member, lubricating oil supplied between the guide surfaces and the sliding surfaces;

at least one relief groove that relieves dynamic pressure of the lubricating oil occurring between the pair of guide surfaces and the pair of sliding surfaces is formed on each sliding surfaces; and the number of the relief grooves formed on the one half portion of sliding surfaces is less than number of the relief grooves formed on the other half portion of sliding surfaces so that the one half portion of sliding surfaces is asymmetric with the other half portion of sliding surfaces.

5. A sliding guide apparatus which guides a movable member for a base comprising:

a pair of guide surfaces formed on the base;

a pair of sliding surfaces formed on the movable member so as to be opposed to the pair of guide surfaces, respectively; wherein one half portion of each sliding surfaces in its longitudinal direction which is close to the center of gravity of the movable member is asymmetric with the other half portion of each sliding surfaces which is far from the center of gravity of the movable member, lubricating oil supplied between the guide surfaces and the sliding surfaces;

at least one relief groove that relieves dynamic pressure of the lubricating oil occurring between the pair of guide surfaces and the pair of sliding surfaces is formed on each sliding surfaces; and an arrangement of the relief groove formed on the one half portion of sliding surfaces is different with arrangement of the relief groove formed on the other half portion of sliding surfaces so that the one half portion of sliding surfaces is asymmetric with the other half portion of sliding surfaces.

6. A machine tool which is equipped with a sliding guide apparatus comprises:

a base;

a guide surface formed on the base;

a movable member guided on the base;

a sliding surface formed on the movable member so as to be opposed to the guide surface; wherein one half portion of the sliding surface which is close to the center of gravity of the movable member is asymmetric with the other half portion of the sliding surface which is far from the center of gravity of the movable member, lubricating oil supplied between the guide surface and the sliding surface; and at least one relief groove that relieves dynamic pressure of the lubricating oil occurring between the guide surface and the sliding surface formed on the other half portion of the sliding surface so that the one half portion of sliding surface is asymmetric with the other half portion of the sliding surface.

* * * * *